UNITED STATES PATENT OFFICE.

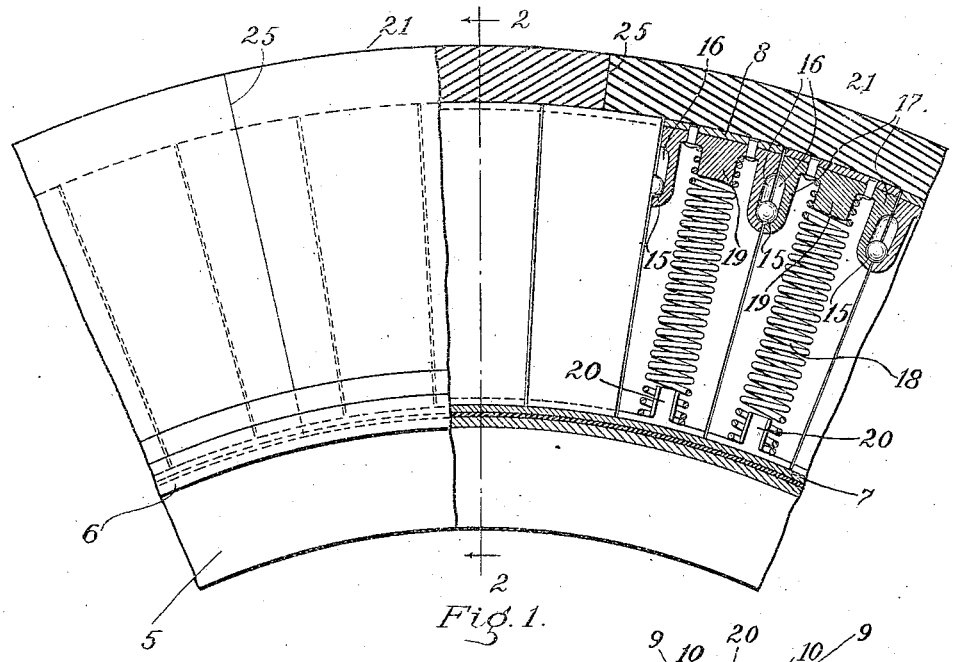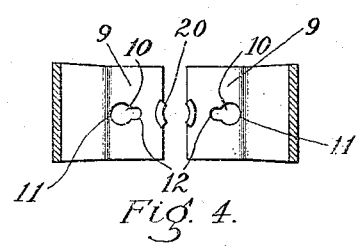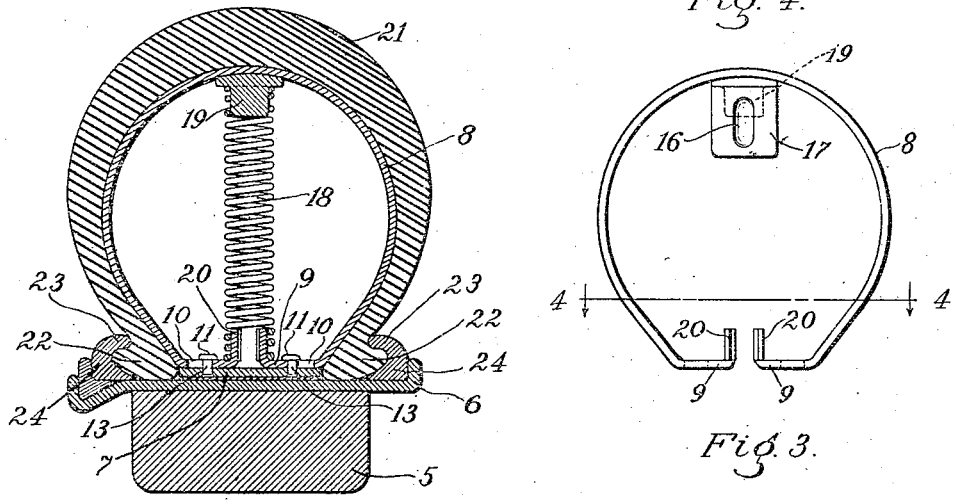

BENJAMIN C. MUDGE, OF NORTH BROOKFIELD, MASSACHUSETTS.

TIRE.

1,198,747.  Specification of Letters Patent.   Patented Sept. 19, 1916.

Application filed November 20, 1913. Serial No. 802,034.

*To all whom it may concern:*

Be it known that I, BENJAMIN C. MUDGE, a citizen of the United States, residing at North Brookfield, in the county of Worcester and State of Massachusetts, have invented new and useful Improvements in Tires, of which the following is a specification.

This invention relates to improvements in tires particularly adapted for use on motor vehicles.

There have been numerous attempts at the production of tires constructed partially or entirely of metal and adapted to embody the desirable features of the pneumatic tires, but more durable and non-puncturable. These attempts have however proved more or less unsatisfactory, one reason being that they fail to provide the local yielding effect of the pneumatic tires which would permit said tires to yield at the particular points at which they were engaged by small obstructions, such as stones and the like, without imparting any perceptible shock to the vehicle itself. Another reason largely responsible for the failure of said metallic tires is that said tires are noisy, due to the rattling or scraping of the various parts together.

The object of this invention is to provide a non-puncturable durable tire embodying in addition to these features the advantages obtained by the use of the pneumatic tire, as hereinbefore set forth.

The invention consists in the combination and arrangement of parts whereby the above objects and certain other objects hereinafter appearing may be attained, as set forth in the following specification and particularly pointed out in the claims.

Referring to the drawings: Figure 1 is an elevation, partly in section, of a portion of a wheel rim and tire embodying my invention. Fig. 2 is a transverse section taken on line 2—2 of Fig. 1. Fig. 3 is a detail end elevation of one of the resilient sections of a tire. Fig. 4 is a section taken on line 4—4 of Fig. 3.

Like numerals refer to like parts throughout the several views of the drawings.

In the drawings, 5 is the felly and 6 the permanent rim of the wheel which may be constructed in accordance with any of the common types of rims. A ring 7 is mounted upon said rim 6 substantially in the center thereof and has detachably secured thereto a plurality of independently resilient sections or members 8 constituting springs, preferably circularly formed of metal and arranged transversely of said permanent rim and circumferentially thereabout.

The members 8 are preferably bent at their inner portions to form feet 9 which are directed toward each other and engage the ring 7, each of said feet being provided with slots 10 arranged transversely relatively to said ring 7 and with their outer ends 11 substantially larger than their inner ends 12. Studs 13 are secured to the ring 7, said studs being provided with heads 14. The springs 8 are placed upon the rings 7 by first deflecting the ends 9 until the portions 11 of the slots 10 aline with the heads 14 of said studs and after pressing said feet against the ring 7, the feet of said springs are permitted to return to their normal positions, causing the studs 13 to occupy the inner ends of said slots 10 which substantially fit said studs and by means of the heads 14 lock said springs to said ring.

The members 8 are arranged about the ring 7 substantially close together, but are prevented from contacting one with the other at their inner portions by said ring 7 which firmly unites said inner portions, while the outer portions of said members are prevented from contacting one with the other by friction reducing means interposed between the adjacent portions thereof and consisting preferably of balls 15 arranged in sockets 16, said sockets being slightly elongated to permit a radial movement of the balls 15 relatively to said tire, during the movements of the outer or tread portions of said springs relatively to each other.

The sockets 16 are preferably formed in brackets 17 riveted to the tread portions of the members 8. Supplementary springs 18, preferably helical, are disposed within said members, the median axial lines of said springs lying substantially radial relatively to said tire. These springs are positioned at their outer ends within said members 8 by lugs 19 formed upon said brackets and telescoping the ends of said springs, while the inner ends of said springs are positioned by lugs 20 formed upon the adjacent ends of the feet 9 of said members 8.

A shoe 21 is arranged to cover the sections 8 and may be made after the pattern of the ordinary tire shoe, although the same need not be as heavy as those constructed for pneumatic tires. These may be constructed of rubber, leather or other suitable material with the usual beads 22 extending circumferentially thereof to engage the flanges 23 of the rings 24 by means of which said shoe may be secured to the permanent rim 6. For convenience in assembling the tire said shoe 21 may be made in sections, if desired, by cutting said shoe as at 25 permitting access to certain of the sections 8 protected thereby without disturbing the remaining sections of said tire. The balls 15 are loosely mounted in their sockets 16 thereby permitting the compression of one or more of the sections 8 without unnecessarily binding said sections. The united strength of said sections is sufficient to withstand the circumferential stresses applied to said tire, particularly to the tires on the driving wheels of the vehicle.

Having thus described my invention what I claim and desire by Letters Patent to secure is:

A tire having, in combination, a shoe, a ring, a plurality of circularly formed resilient metallic sections arranged circumferentially of said ring, said sections being inclosed within said shoe and terminating in inwardly projecting lugs, said members each having a pair of slots adjacent to their ends, the adjacent ends of said slots being of reduced width, a pair of studs fast to said ring and projecting through said slots, and a supplementary spring interposed between the outer and inner portions of each of said sections with its inner end encircling the said inwardly projecting lugs, whereby said supporting spring is positioned.

In testimony whereof I have hereunto set my hand in presence of two subscribing witnesses.

BENJAMIN C. MUDGE.

Witnesses:
SYDNEY E. TAFT,
ANNIE J. DAILEY.

Copies of this patent may be obtained for five cents each, by addressing the "Commissioner of Patents, Washington, D. C."